(12) United States Patent
Aoyama (10) Patent No.: US 8,006,475 B2
(45) Date of Patent: Aug. 30, 2011

(54) STEEL CORD FOR REINFORCING RUBBER AND PNEUMATIC RADIAL TIRE

(75) Inventor: Masanori Aoyama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 159 days.

(21) Appl. No.: 12/439,039

(22) PCT Filed: Aug. 31, 2006

(86) PCT No.: PCT/JP2006/317180
§ 371 (c)(1),
(2), (4) Date: Feb. 26, 2009

(87) PCT Pub. No.: WO2008/026271
PCT Pub. Date: Mar. 6, 2008

(65) Prior Publication Data
US 2009/0205308 A1    Aug. 20, 2009

(51) Int. Cl.
*D02G 3/22* (2006.01)
(52) U.S. Cl. .......................... 57/212; 57/236
(58) Field of Classification Search ............ 57/212–214, 57/218, 236, 237
See application file for complete search history.

(56) References Cited

U.S. PATENT DOCUMENTS

| | | | | |
|---|---|---|---|---|
| 2,492,352 A | * | 12/1949 | Bourdon | 57/215 |
| 2,792,868 A | * | 5/1957 | Benson | 152/153 |
| 3,413,799 A | * | 12/1968 | Lejeune | 57/217 |
| 3,555,789 A | * | 1/1971 | Terragna | 57/218 |
| 5,768,874 A | * | 6/1998 | Bourgois et al. | 57/218 |
| 6,365,273 B1 | * | 4/2002 | Baillievier | 428/379 |
| 6,817,395 B2 | * | 11/2004 | Sinopoli et al. | 152/527 |
| 7,272,921 B2 | * | 9/2007 | Misrachi | 57/237 |

FOREIGN PATENT DOCUMENTS

| | | |
|---|---|---|
| JP | 10-298878 A | 11/1998 |
| JP | 10-298879 A | 11/1998 |
| JP | 2002-030587 A | 1/2002 |
| JP | 2005-314833 A | 11/2005 |

* cited by examiner

*Primary Examiner* — Shaun R Hurley
(74) *Attorney, Agent, or Firm* — Sughrue Mion, PLLC (57) ABSTRACT

Provided are a steel cord for reinforcing rubber whose fatigue resistance is increased more than ever to enable achieving high durability that was not conventionally realized, and a pneumatic radial tire including the steel cord as a reinforcement member.

In a steel cord for reinforcing rubber having a double-twist structure that includes a plurality of strands twisted together in the same direction with the same pitch and including a central structure and at least one outer layer, the central structure is composed of at least two strands being twisted around each other and each being composed of at least seven filaments being twisted together. In a steel cord for reinforcing rubber including at least three core strands being twisted together and at least six sheath strands being twisted together around the core strands, the core strands and the sheath strands are twisted in the same direction.

17 Claims, 7 Drawing Sheets

Related Art

STEEL CORD FOR REINFORCING RUBBER AND PNEUMATIC RADIAL TIRE

TECHNICAL FIELD

The present invention relates to a steel cord for reinforcing rubber and a pneumatic radial tire, and more specifically relates to a steel cord for reinforcing rubber and a pneumatic radial tire, in particular, a pneumatic radial tire (ORR) for a construction vehicle, whose durability is improved more than ever.

BACKGROUND ART

Recently, tires also have been required to be more durable to high speed and high load, according to development of vehicles. In particular, since construction vehicles, such as a mining vehicle, are driven on a bad road with a heavy load, the tire-reinforcing steel cord of pneumatic radial tires for the construction vehicles is also required to be further improved in fatigue resistance to input power, such as bending and compression, and in resistance to cutting by external damage.

Figure 12:
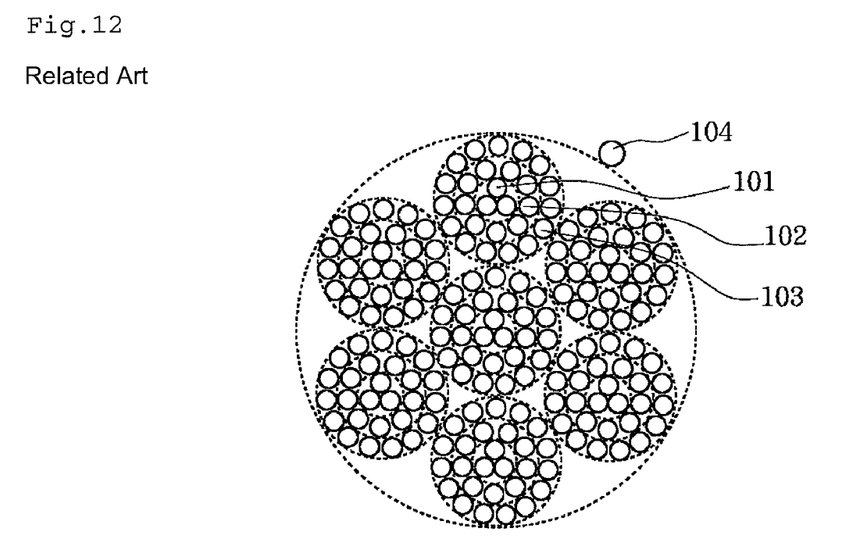
FIG. 12 is a cross-sectional view of a steel cord according to Comparative Examples 1-1 and 2-1.

Since the steel cord for reinforcing the tire for such a vehicle is required to have high strength, conventionally, a steel cord having a double-twist structure, in which strands each composed of a plurality of steel filaments that are twisted together are further twisted, is widely used. For example, a steel cord having a 1×(3+9+15)+6×(3+9+15)+1 structure, as shown in FIG. 12, is known.

In addition, Patent Documents 1 and 2 disclose steel cords reinforcing rubber products, which have double-twist structures enabling to efficiently obtain high cord strength and to have excellent resistance to corrosion. The steel cord of Patent Document 1 is a twist cord with two or three layers where at least a part of filaments constituting a core and a sheath is a strand that is further composed of one core filament and four sheath filaments, and the steel cord of Patent Document 2 is a twist cord with two or three layers where at least a part of filaments constituting a core and a sheath is a strand that is further composed of one core filament and three sheath filaments.

Furthermore, Patent Document 3 discloses a steel cord capable of reducing its rigidity while maintaining the cord-breaking force at a level equal to or higher than that of the previously existing steel cords or capable of increasing the cord-breaking force while maintaining the rigidity at a level equal to or lower than that of the previously existing steel cords, provided that the cord diameters thereof are approximately the same. The steel cord has a predetermined cord diameter and filament diameter and is composed of three core strands that are twisted together and at least eight side strands that are twisted together around the core strands. Either the core strands or the side strands has a layer twist structure of at least two layers, and the other has a layer twist structure of at least three layers.

Patent Document 1: Japanese Unexamined Patent Application Publication No. 10-298878 (for example, Claims)
Patent Document 2: Japanese Unexamined Patent Application Publication No. 10-298879 (for example, Claims)
Patent Document 3: Japanese Unexamined Patent Application Publication No. 2002-30587 (for example, Claims)

DISCLOSURE OF INVENTION

Problems to be Solved by the Invention

As described above, the steel cord applied to a pneumatic radial tire for a construction vehicle is strongly required to be improved in fatigue resistance to input power, such as bending and compression. However, it would have to say that, recently, steel cords having conventional double-twist structures have reached a limit in the improvement of performance.

Accordingly, it is an object of the present invention to provide a steel cord for reinforcing rubber whose fatigue resistance is increased more than ever to enable achieving high durability that was not conventionally realized, and a pneumatic radial tire including the steel cord as a reinforcement member.

Means for Solving the Problems

The present inventor has conducted intensive investigation for solving the above-mentioned problems and, as a result, has found the following facts: Increase of input power, i.e., bending and compression, to a tire due to high speed driving with high load may locally compress and largely deform a steel cord for reinforcement, resulting in fatigue break of the cord. The deformation by compression resembles the appearance of half or one wavelength of a sine wave. When this deformation is ideal sine-wave-shaped deformation, the distortion due to compression is dispersed to avoid breakage, resulting in an increase in the lifetime. When the deformation resembles the appearance of a triangle wave, the distortion is concentrated near the vertices to cause breakage, resulting in a large decrease in the lifetime.

The inventor has further conducted intensive investigation based on the above-mentioned findings that the fatigue break can be avoided to increase the lifetime if the deformation by compression can be controlled by a cord structure. As a result, the present invention has been completed.

That is, the first steel cord for reinforcing rubber of the present invention is a steel cord for reinforcing rubber having a double-twist structure that includes a plurality of strands twisted together in the same direction with the same pitch and including a central structure and at least one outer layer, wherein the central structure is composed of at least two strands being twisted around each other and each of the strands is composed of at least seven filaments being twisted together.

In the first steel cord for reinforcing rubber of the present invention, the strands each preferably have a layer twist structure of at least two layers. Preferred examples of the cord structure include 12×(3+9), 3×(3+9)+9×(3+9+15), 12×(3+9+15), and 27×(1+6) twist structures. In addition, the filament diameter of each filament constituting the strand is preferably 0.14 mm or more and 0.36 mm or less.

Furthermore, the second steel cord for reinforcing rubber of the present invention is a steel cord composed of at least three core strands that are twisted together and at least six sheath strands that are twisted together around the core strands, and the core strands and the sheath strands are twisted in the same direction.

In the second steel cord for reinforcing rubber of the present invention, the sheath strands each preferably have a layer twist structure of at least two layers. Preferred examples of the cord structure include 3×(3+9+15)+9×(3+9+15), 3×(3+9)+9×(3+9), 3×(3+9)+8×(3+9+15), 3×(3+9)+6×(3+9+15), and 3×(3+9)+9×(3+9+15) twist structures. In addition, the filament diameter of each filament constituting the strand is preferably 0.14 mm or more and 0.36 mm or less. Furthermore, it is preferred that the helical radius r and the helical pitch p of the core strands and the helical radius R and the helical pitch P of the sheath strands satisfy the following relationship:

$$86° \geq \tan^{-1}(p/2\pi r) \geq \tan^{-1}(P/2\pi R) \geq 74°.$$

Furthermore, the pneumatic radial tire of the present invention has a carcass toroidally extending between a pair of bead portions as a framework and a crown portion, of the carcass, reinforced by a belt layer, wherein the above-mentioned steel cord for reinforcing rubber is used as a cord constituting the carcass and/or the belt layer.

Advantages

According to the steel cord for reinforcing rubber of the present invention, fatigue resistance can be increased more than ever to enable achieving high durability that has not been conventionally realized. Accordingly, the pneumatic radial tire having the steel cord for reinforcing rubber as a reinforcement member exhibits excellent durability and, in particular, can be preferably used as a pneumatic radial tire (ORR) for a construction vehicle.

REFERENCE NUMERALS 1, 11, 21, 31, 41, 51, 61: core filament
2, 12, 62: sheath filament
3, 13, 34, 44, 63: spiral filament
22, 32, 42, 52: inner sheath filament
23, 33, 43, 53: outer sheath filament
401, 411, 421, 431, 441, 451: core filament
402, 432, 452: inner sheath filament
403, 433, 453: outer sheath filament
404, 413, 423, 443: spiral filament
412, 422, 442: sheath filament

BEST MODES FOR CARRYING OUT THE INVENTION

Embodiments of the present invention will be specifically described below.

The first steel cord for reinforcing rubber of the present invention has a double-twist structure including a plurality of strands twisted together in the same direction with the same pitch (compact twist structure, "cc") and includes a central structure and at least one, preferably one or two, outer layer. It is essential that the central structure is composed of two or more, preferably two to four, and more preferably three, strands being twisted around one another.

When a twist cord is applied with a compression force, the rotational force works to cause sine-wave-shaped deformation in the direction for releasing the twist, i.e., in the direction opposite to the twist direction. It has been ascertained that, at this time, in a cord having a conventionally known (1+6) double-twist structure not having a twist at the center, the application of the compression force causes a large difference in the behaviors of the core strands and the sheath strands and, as a result, the behavior as the entire cord when the compression force is applied is not ideal sine-wave-shaped deformation. Furthermore, in order to obtain ideal sine-wave-shaped deformation, the inventor has reached the finding that, in a steel cord having a double-twist structure that includes a plurality of strands twisted together in the same direction with the same pitch and including a central structure and at least one outer layer, the compression deformation becomes similar to ideal sine-wave-shaped deformation when the central structure has at least two strands being twisted around each other.

In addition, in the first steel cord for reinforcing rubber of the present invention, strength necessary for a pneumatic radial tire for a construction vehicle is ensured by controlling the number of the filaments constituting each strand to 7 or more, preferably 7 or more and 37 or less, and more preferably 12 or more and 27 or less.

In the first steel cord for reinforcing rubber of the present invention, each strand preferably has a layer twist structure having at least two layers. A single layer twist structure cannot sufficiently ensure the strength necessary for a tire for a construction vehicle, and therefore its application range is limited. More preferred is a layer twist structure having three layers, from the viewpoints of productivity and the cord diameter after double twisting.

Figure 5:
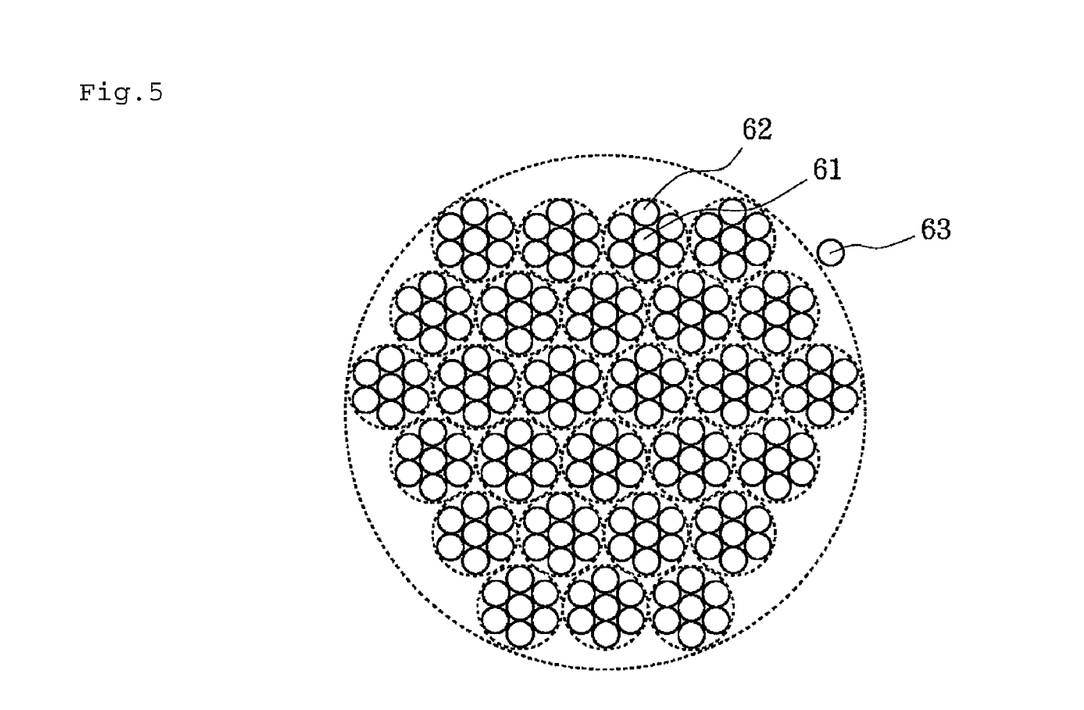
FIG. 5 is a cross-sectional view of a steel cord according to Example 1-5.

From the above-mentioned viewpoints, preferred embodiments of the first steel cord of the present invention include compact twist structures such as 12×(3+9) (see FIG. 1), 3×(3+9)+9×(3+9+15) (see FIG. 2), 12×(3+9+15) (see FIG. 3), and 27×(1+6) (see FIG. 5).

In addition, in the first steel cord of the present invention, the filament diameter of each filament constituting the strand is preferably 0.14 mm or more and 0.36 mm or less. A steel cord having a filament diameter smaller than 0.14 mm cannot maintain the air pressure necessary for a pneumatic radial tire for a construction vehicle, and therefore its application range is limited. On the other hand, in a steel cord having a filament diameter larger than 0.36 mm, the fatigue properties of portions that are largely bent, such as a hump portion, are deteriorated. The filament diameter is more preferably 0.17 mm or more and 0.25 mm or less, from the viewpoints of productivity and the cord diameter after double twisting.

Furthermore, in the first steel cord of the present invention, the diameter of the strands constituting the central structure is larger than that of the strands constituting the outer layer. By doing so, the penetration property of rubber into the inside of the cord can be increased, resulting in an increase in corrosion resistance.

Furthermore, in the second steel cord for reinforcing rubber of the present invention, it is essential that at least three, preferably three or four, core strands are twisted together, and at least six, preferably six or more and twelve or less, and more preferably six or more and nine or less, sheath strands that are twisted together around the core strands; and that the core strands and the sheath strands are twisted in the same direction.

As described above, when a twist cord is applied with a compression force, the rotational force works to cause sine-wave-shaped deformation in the direction for releasing the twist, i.e., in the direction opposite to the twist direction. The present inventor has found, as a result of investigation, that the deformation by compression of the entire cord can be also brought to be close ideal sine-wave-shaped deformation by employing a double twist structure having at least three core strands that are double twisted (n×m) and, in addition, the core strands and the sheath strands being twisted in the same direction.

Here, if the twist direction of the core strands and the twist direction of the sheath strands are opposite to each other, the deformation behaviors of the core strands and the sheath strands are opposite to each other when they are compressed, resulting in not being ideal sine-wave-shaped deformation. Therefore, satisfactory compression fatigue properties cannot be achieved. Accordingly, in the present invention, it is essential that the core strands and the sheath strands are twisted in the same direction.

In the second steel cord for reinforcing rubber of the present invention, the sheath strand preferably has a layer twist structure having at least two layers. A single layer twist structure cannot sufficiently ensure the strength necessary for a tire for a construction vehicle, and therefore its application range is limited. More preferred is a layer twist structure having three layers, from the viewpoints of productivity and the cord diameter after double twisting. In addition, the core strand preferably has a layer twist structure having two or three layers, from the viewpoints of productivity and the cord diameter after double twisting.

Figure 10:
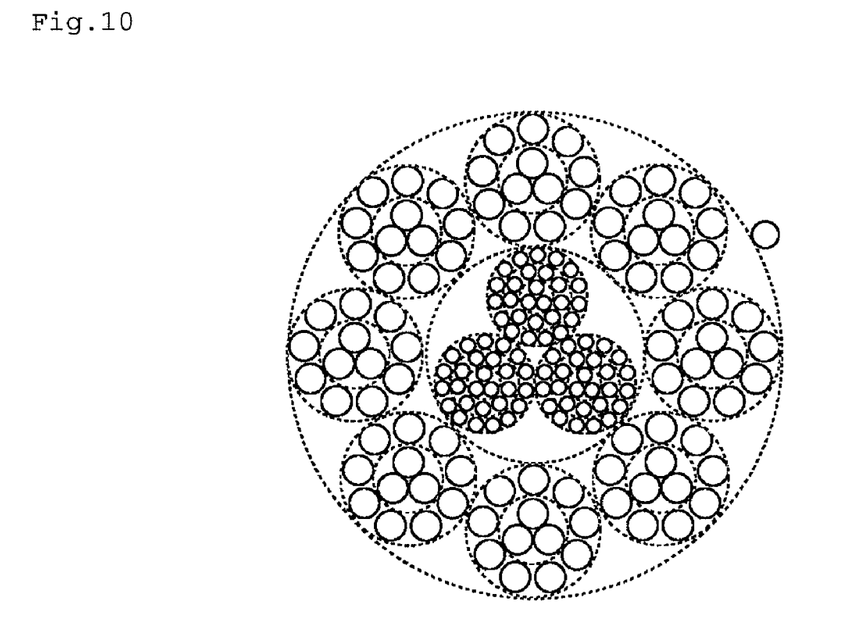
FIG. 10 is a cross-sectional view of a steel cord according to another preferred embodiment of the present invention.
Figure 11:
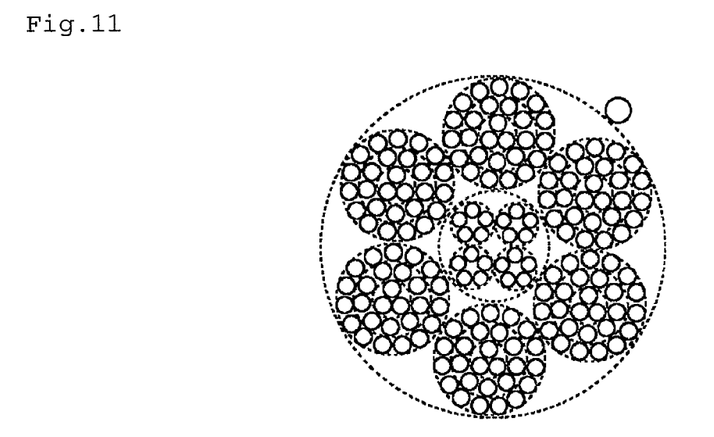
FIG. 11 is a cross-sectional view of a steel cord according to further another preferred embodiment of the present invention.

From the above-mentioned viewpoints, preferred embodiments of the second steel cord of the present invention include 3×(3+9+15)+9×(3+9+15) (see FIG. 6), 3×(3+9)+9×(3+9) (see FIG. 7), 3×(3+9)+8×(3+9+15) (see FIG. 8), 3×(3+9)+6× (3+9+15) (see FIG. 9), 3×(3+9)+9×(3+9+15) (not shown), 3×(3+9+15)+8×(3+9) (see FIG. 10), and 4×5+6×(3+9+15) (see FIG. 11) twist structures.

In addition, in the second steel cord of the present invention, the filament diameter of each filament constituting the strand is preferably 0.14 mm or more and 0.36 mm or less. A steel cord having a filament diameter smaller than 0.14 mm cannot maintain the air pressure necessary for a pneumatic radial tire for a construction vehicle, and therefore its application range is limited. On the other hand, in a steel cord having a filament diameter larger than 0.36 mm, the fatigue properties of portions that are largely bent, such as a hump portion, are deteriorated. The filament diameter is more preferably 0.17 mm or more and 0.25 mm or less, from the viewpoints of productivity and the cord diameter after double twisting. In addition, corrosion resistance can be increased by increasing the penetration property of rubber into the inside of the cord by forming the strands constituting the central structure so as to have a diameter larger than that of the strands constituting the outer layer.

Furthermore, in the second steel cord of the present invention, it is preferred that the helical radius r and the helical pitch p of the core strands and the helical radius R and the helical pitch P of the sheath strands satisfy the following relationship:

$$86° \geq \tan^{-1}(p/2\pi r) \geq \tan^{-1}(P/2\pi R) \geq 74°.$$

A value of $\tan^{-1}(p/2\pi r)$ larger than 86° causes, for example, a large decrease in workability in tire-molding process due to the high rigidity. When a value of $\tan^{-1}(P/2\pi R)$ is smaller than 74°, the cord-breaking force is low, and therefore its application range is limited. In addition, a relationship of $\tan^{-1}(P/2\pi R) > \tan^{-1}(p/2\pi r)$ cannot achieve an improvement in the cord-breaking force and is therefore undesirable.

As described above, the steel cord for reinforcing rubber of the present invention is highly improved in durability compared to steel cords having conventional double twist structures. Therefore, for example, in a pneumatic radial tire whose a carcass and/or a belt layer being applied with a ply of a rubber sheet in which a plurality of the steel cords of the present invention aligned in parallel to each other is embedded, instead of a steel cord with a conventional double twist structure, the durability is highly improved. Accordingly, in the pneumatic radial tire of the present invention, which is not shown in the drawings, having a carcass toroidally extending between a pair of bead portions as a framework and a crown portion, of the carcass, reinforced by a belt layer, the carcass and/or the belt layer are applied with the above-described steel cord for reinforcing rubber of the present invention.

EXAMPLE

The present invention will be described in detail with reference to Examples below.

Example 1-1

Figure 1:
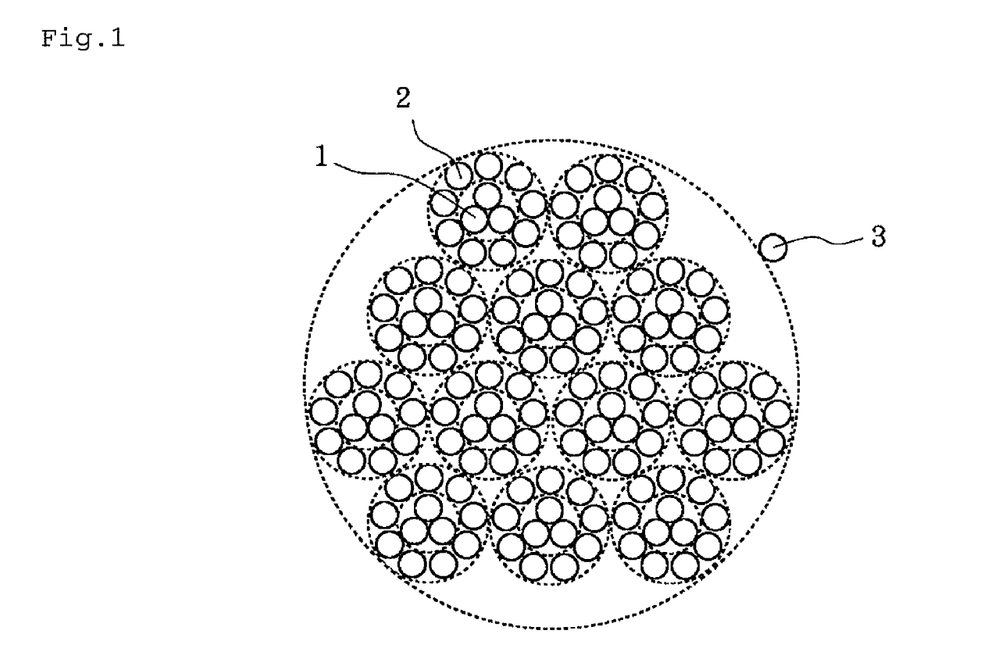
FIG. 1 is a cross-sectional view of a steel cord according to Example 1-1.

A steel cord having the cord structure shown in Table 1 below as Example 1-1 was prototyped. This steel cord includes twelve strands each having a layer twist structure of 3+9 that is composed of three core filaments 1 and nine sheath filaments 2 and being twisted together in the same direction with the same pitch and further includes one spiral filament 3 winding around the strands. The central structure is formed of three of the strands twisted around one another. FIG. 1 shows the cross-sectional structure of this steel cord.

Example 1-2

Figure 2:
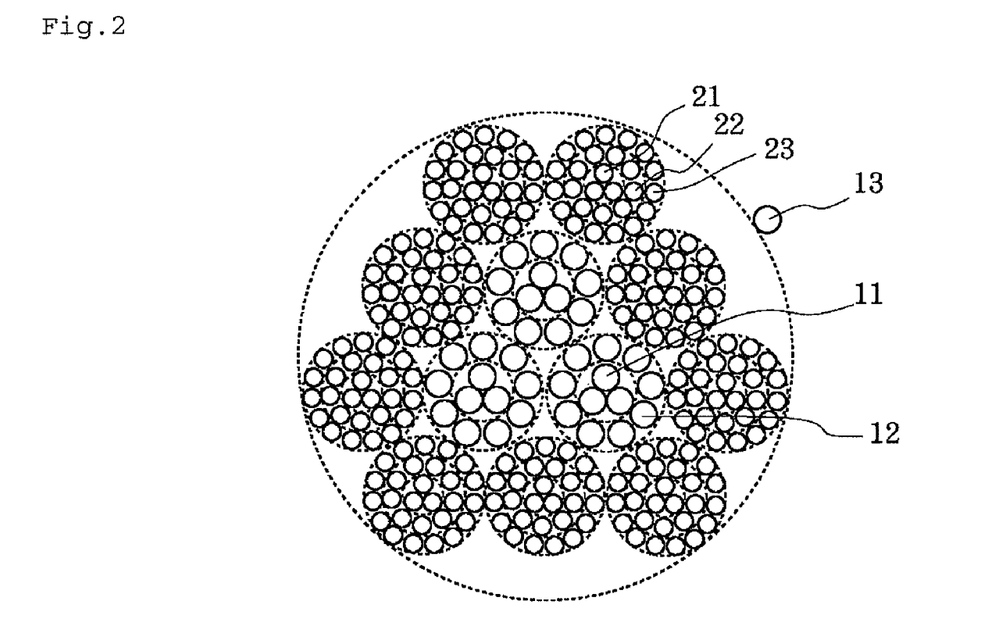
FIG. 2 is a cross-sectional view of a steel cord according to Example 1-2.

A steel cord having the cord structure shown in Table 1 below as Example 1-2 was prototyped. This steel cord includes three strands constituting a central layer and each having a layer twist structure of 3+9 that is composed of three core filaments 11 and nine sheath filaments 12; nine strands each having a layer twist structure of 3+9+15 that is composed of three core filaments 21, nine inner sheath filaments 22, and fifteen outer sheath filaments 23 and being twisted together in the same direction with the same pitch around the central layer; and further one spiral filament 13 winding around the strands. The central structure is formed of the three strands twisted around one another. FIG. 2 shows the cross-sectional structure of this steel cord.

Example 1-3

Figure 3:
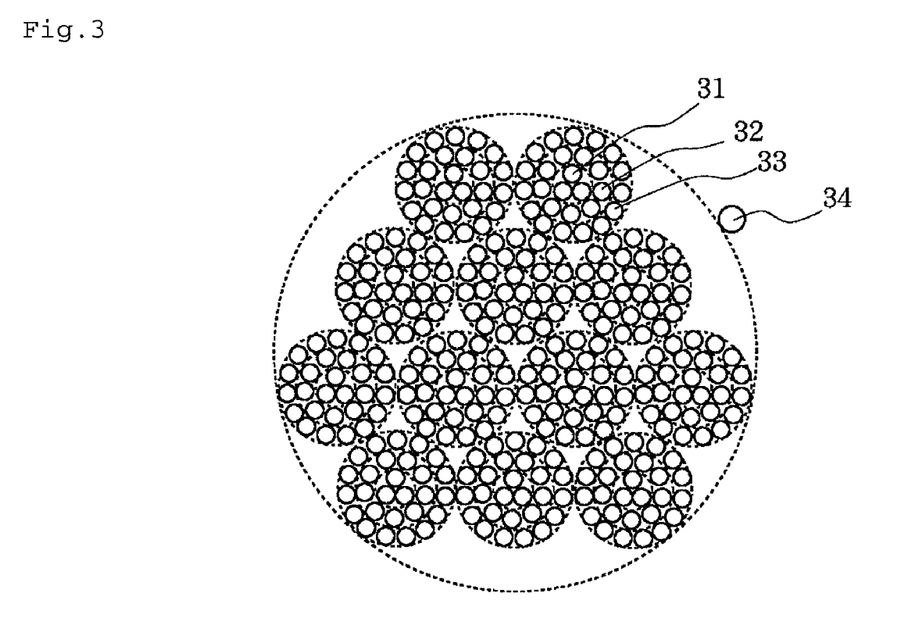
FIG. 3 is a cross-sectional view of a steel cord according to Example 1-3.

A steel cord having the cord structure shown in Table 1 below as Example 1-3 was prototyped. This steel cord includes twelve strands each having a layer twist structure of 3+9+15 that is composed of three core filaments 31, nine inner sheath filaments 32, and fifteen outer sheath filaments 33 and being twisted together in the same direction with the same pitch and further includes a spiral filament 34 winding around the strands. The central structure is formed of three of the strands twisted around one another. FIG. 3 shows the cross-sectional structure of this steel cord.

Example 1-4

Figure 4:
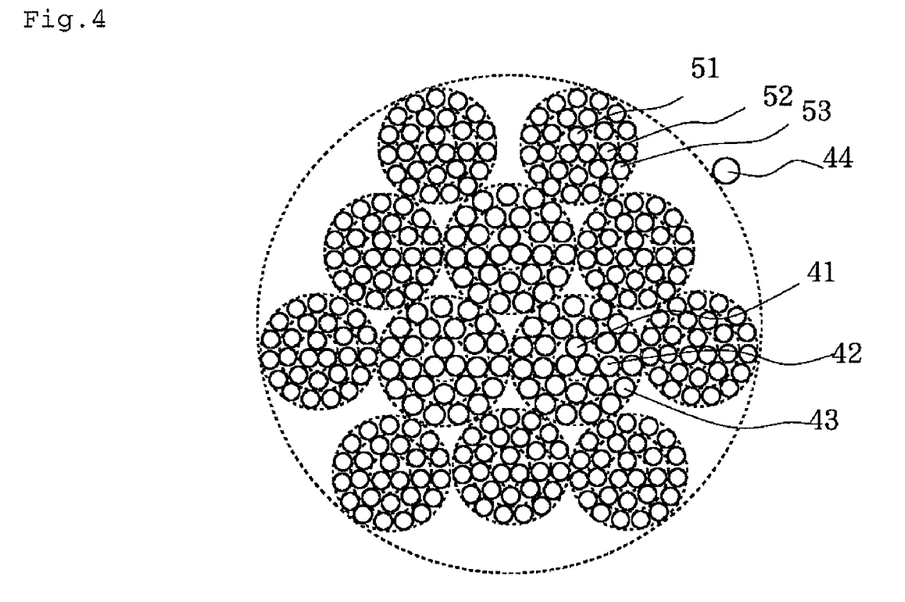
FIG. 4 is a cross-sectional view of a steel cord according to Example 1-4.

A steel cord having the cord structure shown in Table 1 below as Example 1-4 was prototyped. This steel cord includes three strands constituting a central layer and each having a layer twist structure of 3+9+15 that is composed of three core filaments 41, nine inner sheath filaments 42, and fifteen outer sheath filaments 43; nine strands of a structure of 3+9+15 that is composed of three core filaments 51, nine inner sheath filaments 52, and fifteen outer sheath filaments 53 whose diameter is smaller than that of the filaments forming the strands of the central layer and being twisted together in the same direction with the same pitch around the central layer; and further one spiral filament 44 winding around the strands. The central structure is formed of the three strands twisted around one another. FIG. 4 shows the cross-sectional structure of this steel cord.

Example 1-5

A steel cord having the cord structure shown in Table 1 below as Example 1-5 was prototyped. This steel cord includes twenty-seven strands each having a layer twist structure of 1+6 that is composed of one core filament 61 and six sheath filaments 62 and being twisted together in the same direction with the same pitch and further includes one spiral filament 63 winding around the strands. The central structure is formed of three of the strands twisted around one another. FIG. 5 shows the cross-sectional structure of this steel cord.

Comparative Example 1-1

A steel cord having the cord structure shown in Table 1 below as Comparative Example 1-1 was prototyped. This steel cord includes one strand having a layer twist structure of 3+9+15 that is composed of three core filaments 101, nine inner sheath filaments 102, and fifteen outer sheath filaments 103; six strands each having the same structure as above and being twisted together around the one strand; and further one spiral filament 104 winding around the strands. The central structure is formed of the one strand. FIG. 12 shows the cross-sectional structure of this steel cord.

Comparative Example 1-2

Figure 13:
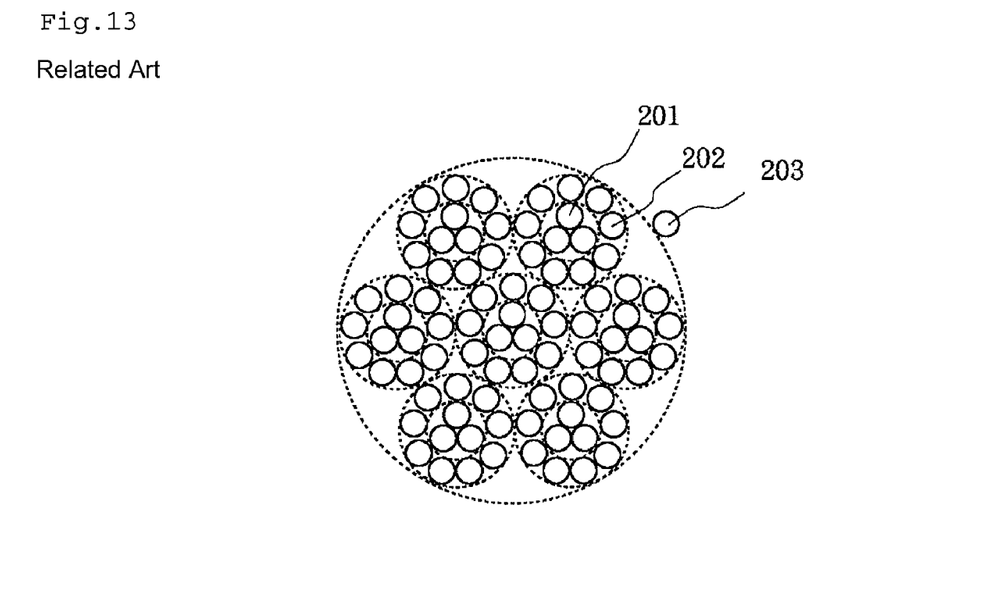
FIG. 13 is a cross-sectional view of a steel cord according to Comparative Examples 1-2 and 2-2.

A steel cord having the cord structure shown in Table 1 below as Comparative Example 1-2 was prototyped. This steel cord includes one strand having a layer twist structure of 3+9 that is composed of three core filaments 201 and nine sheath filaments 202; six strands each having the same structure as above and being twisted together around the one strand; and further one spiral filament 203 winding around the strands. The central structure is formed of the one strand. FIG. 13 shows the cross-sectional structure of this steel cord.

Comparative Example 1-3

Figure 14:
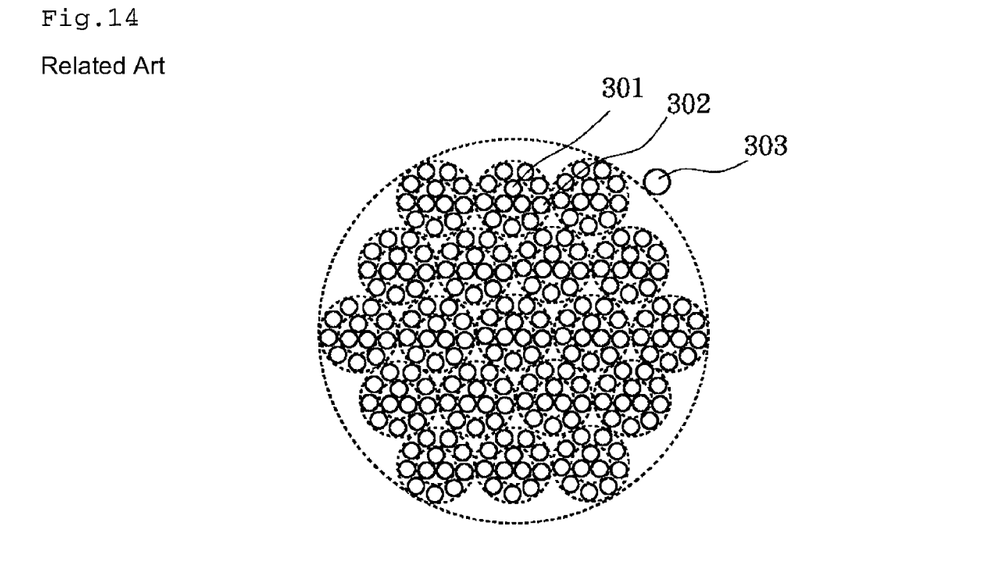
FIG. 14 is a cross-sectional view of a steel cord according to Comparative Example 1-3.

A steel cord having the cord structure shown in Table 1 below as Comparative Example 1-3 was prototyped. This steel cord includes nineteen strands each having a layer twist structure of 3+9 that is composed of three core filaments 301 and nine sheath filaments 302 and being twisted together in the same direction with the same pitch and further includes one spiral filament 303 winding around the strands. The central structure is formed of one of the strands. FIG. 14 shows the cross-sectional structure of this steel cord.

Tires 59/80R63 for a construction vehicle having carcass plies applied with these prototyped steel cords were prepared and subjected to a durability test by straight-ahead driving at 8 km/h over a drum with a diameter of 5 m under the conditions of a regular inner pressure specified by the JATMA and a load of 150% of the regular load. In this durability test, the driving was continued until breakdown occurs. The time until the breakdown was expressed by an index on the basis that the value in Comparative Example 1-1 is 100. A larger number means a longer driving time, that is, higher durability. In addition, it was examined whether breakage of the steel cords was present. The following Table 1 shows the results.

TABLE 1

|  |  | Comparative Example 1-1 | Comparative Example 1-2 | Example 1-1 | Example 1-2 | Example 1-3 | Example 1-4 | Example 1-5 | Comparative Example 1-3 |
|---|---|---|---|---|---|---|---|---|---|
| Cord | Structure | 1 + 6 | 1 + 6 | 12 cc | 12 cc | 12 cc | 12 cc | 27 cc | 19 cc |
|  | Twist direction (central layer/outer layer) | —/S | —/S | Z/Z | Z/Z | Z/Z | Z/Z | Z/Z/Z | —/Z/Z |
|  | Twist pitch (mm) | —/45 | —/50 | 60/60 | 60/60 | 60/60 | 60/60 | 45/45/45 | —/45/45 |
|  | Diameter (mm) | 4.62 | 4.49 | 4.46 | 4.44 | 4.44 | 4.63 | 4.68 | 4.56 |
| Central layer strand | Structure | 3 + 9 + 15 | 3 + 9 | 3 + 9 | 3 + 9 | 3 + 9 + 15 | 3 + 9 + 15 | 1 + 6 | 3 + 9 |
|  | Twist direction | Z/Z/Z | Z/Z | Z/Z | Z/Z | Z/Z/Z | Z/Z/Z | —/Z | Z/Z |
|  | Twist pitch (mm) | 6/12/18 | 6/8 | 6/8 | 6/12/18 | 6/12/18 | 6/12/18 | —/8 | 6/8 |
|  | Strand diameter (mm) | 1.54 | 1.5 | 1.14 | 1.14 | 1.14 | 1.23 | 0.68 | 0.93 |
|  | Filament diameter (mm) | 0.25 | 0.36 | 0.275 | 0.275 | 0.185 | 0.2 | 0.225 | 0.225 |
| Outer layer strand | Structure | 3 + 9 + 15 | 3 + 9 | 3 + 9 | 3 + 9 + 15 | 3 + 9 + 15 | 3 + 9 + 15 | 1 + 6 | 3 + 9 |
|  | Twist direction | Z/Z/Z | Z/Z | Z/Z | Z/Z/Z | Z/Z/Z | Z/Z/Z | —/Z | Z/Z |
|  | Twist pitch (mm) | 6/12/18 | 6/8 | 6/8 | 6/12/18 | 6/12/18 | 6/12/18 | —/8 | 6/8 |

TABLE 1-continued

|  | Comparative Example 1-1 | Comparative Example 1-2 | Example 1-1 | Example 1-2 | Example 1-3 | Example 1-4 | Example 1-5 | Comparative Example 1-3 |
|---|---|---|---|---|---|---|---|---|
| Strand diameter (mm) | 1.54 | 1.5 | 1.14 | 1.14 | 1.14 | 1.14 | 0.68 | 0.93 |
| Filament diameter (mm) | 0.25 | 0.36 | 0.275 | 0.185 | 0.185 | 0.185 | 0.225 | 0.225 |
| Tire durability test (index) | 100 | 89 | 138 | 142 | 165 | 148 | 150 | 96 |
| Breakage of steel cord | Occurred | Occurred | Not occurred | Not occurred | Not occurred | Not occurred | Not occurred | Occurred |

As obvious from Table 1, no steel cord of all the tires in Examples was broken, resulting in confirmation of high durability of the tires.

Example 2-1

Figure 6:
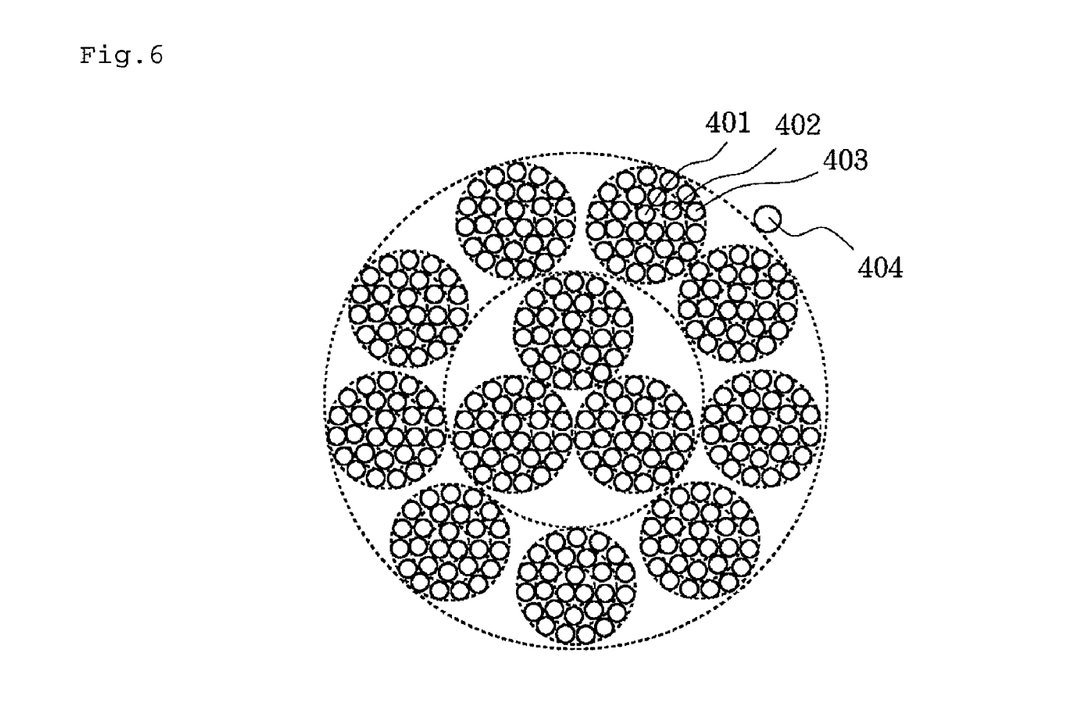
FIG. 6 is a cross-sectional view of a steel cord according to Example 2-1.

A steel cord having the cord structure shown in Table 2 below as Example 2-1 was prototyped. This steel cord includes three core strands each having a layer twist structure of 3+9+15 that is composed of three core filaments 401, nine inner sheath filaments 402, and fifteen outer sheath filaments 403; nine strands each having the same layer twist structure as above and being twisted together around the core strands in the same direction as that of the core strands; and further one spiral filament 404 winding around the strands. FIG. 6 shows the cross-sectional structure of this steel cord.

Example 2-2

Figure 7:
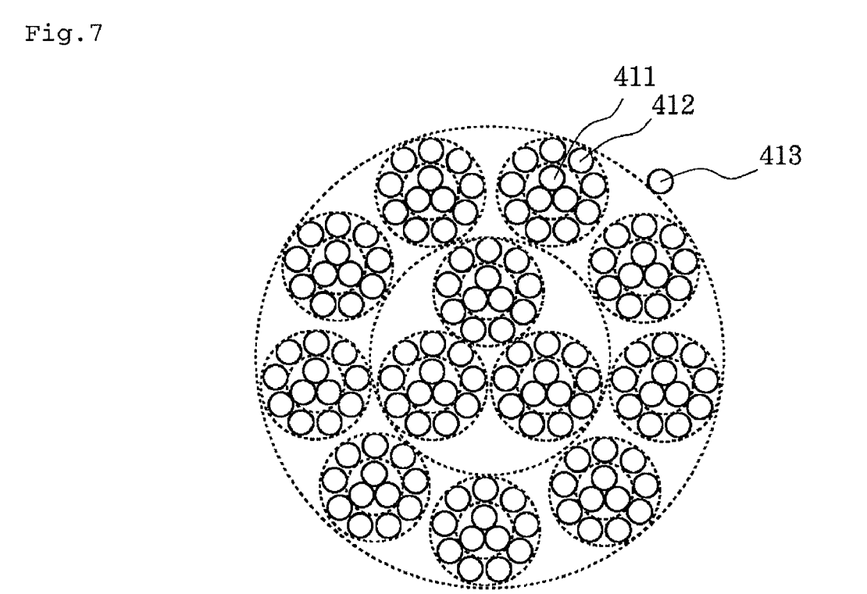
FIG. 7 is a cross-sectional view of a steel cord according to Example 2-2.

A steel cord having the cord structure shown in Table 2 below as Example 2-2 was prototyped. This steel cord includes three core strands each having a layer twist structure of 3+9 that is composed of three core filaments 411 and nine sheath filaments 412; nine strands each having the same layer twist structure as above and being twisted together around the core strands in the same direction as that of the core strands; and further one spiral filament 413 winding around the strands. FIG. 7 shows the cross-sectional structure of this steel cord.

Example 2-3

Figure 8:
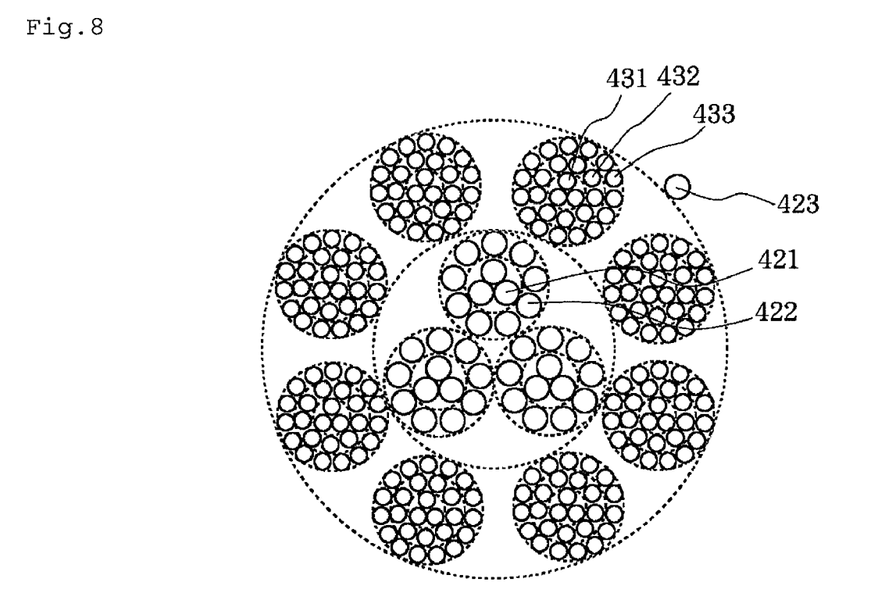
FIG. 8 is a cross-sectional view of a steel cord according to Example 2-3.

A steel cord having the cord structure shown in Table 2 below as Example 2-3 was prototyped. This steel cord includes three core strands each having a layer twist structure of 3+9 that is composed of three core filaments 421 and nine sheath filaments 422; eight strands each having a layer twist structure of 3+9+15 that is composed of three core filaments 431, nine inner sheath filaments 432, and fifteen outer sheath filaments 433 and being twisted together around the core strands in the same direction as that of the core strands; and further one spiral filament 423 winding around the strands. The central structure is formed of the three core strands twisted around one another. FIG. 8 shows the cross-sectional structure of this steel cord.

Example 2-4

Figure 9:
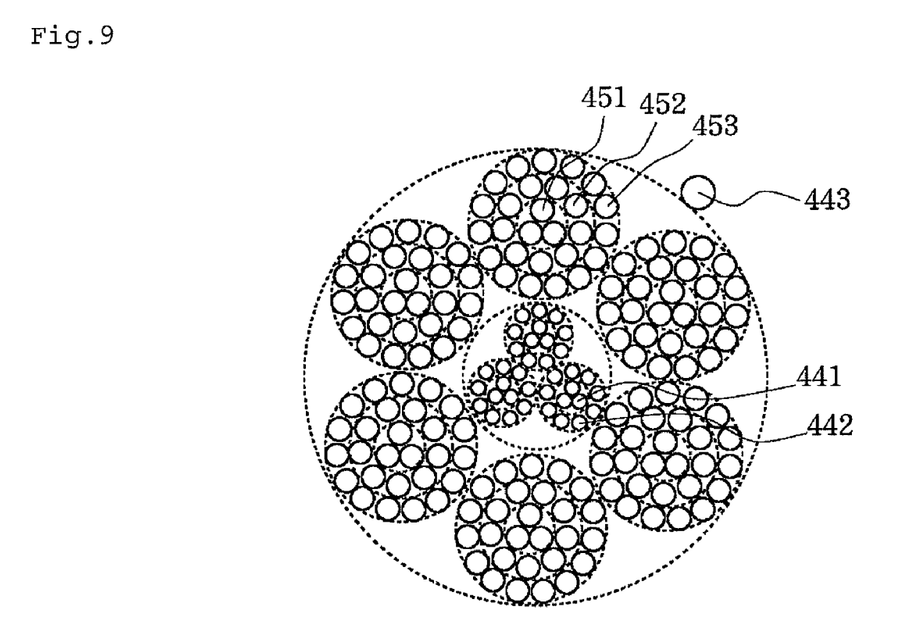
FIG. 9 is a cross-sectional view of a steel cord according to Example 2-4.

A steel cord having the cord structure shown in Table 2 below as Example 2-4 was prototyped. This steel cord includes three core strands each having a layer twist structure of 3+9 that is composed of three core filaments 441 and nine sheath filaments 442; six strands each having a layer twist structure of 3+9+15 that is composed of three core filaments 451, nine inner sheath filaments 452, and fifteen outer sheath filaments 453 and being twisted together around the core strands in the same direction as that of the core strands; and further one spiral filament 443 winding around the strands. The central structure is formed of the three core strands twisted around one another. FIG. 9 shows the cross-sectional structure of this steel cord.

Comparative Example 2-1

A steel cord having the cord structure shown in Table 2 below as Comparative Example 2-1 was prototyped. This steel cord includes one strand having a layer twist structure of 3+9+15 that is composed of three core filaments 101, nine inner sheath filaments 102, and fifteen outer sheath filaments 103; six strands each having the same structure as above around the one strand and being twisted together; and further one spiral filament 104 winding around the strands. The central structure is formed of the one strand. FIG. 12 shows the cross-sectional structure of this steel cord.

Comparative Example 2-2

A steel cord having the cord structure shown in Table 2 below as Comparative Example 2-2 was prototyped. This steel cord includes one strand having a layer twist structure of 3+9 that is composed of three core filaments 201 and nine sheath filaments 202; six strands each having the same structure as above around the one strand and being twisted together; and further one spiral filament 203 winding around the strands. The central structure is formed of the one strand. FIG. 13 shows the cross-sectional structure of this steel cord.

Comparative Example 2-3

A steel cord having the cord structure shown in Table 2 below as Comparative Example 2-3 was prototyped. This steel cord includes three core strands each having a layer twist structure of 3+9+15 that is composed of three core filaments, nine inner sheath filaments, and fifteen outer sheath filaments; nine strands each having the same layer twist structure as above and being twisted together around the core strands in the direction opposite to that of the core strands; and further one spiral filament winding around the strands. The cross-sectional structure of this steel cord is the same as that shown in FIG. 6.

Tires 53/80R63 for a construction vehicle having belts applied with these prototyped steel cords were prepared and subjected to a durability test by straight-ahead driving at 8 km/h over a drum with a diameter of 5 m under the conditions of a regular inner pressure specified by the JATMA and a load of 150% of the regular load. In this durability test, the driving was continued until breakdown occurs. The time until the breakdown was expressed by an index on the basis that the value in Comparative Example 2-1 is 100. A larger number means a longer driving time, that is, a higher durability. In addition, it was examined whether breakage of the steel cords was present. The following Table 2 shows the results.

TABLE 2

| | | Comparative Example 2-1 | Comparative Example 2-2 | Example 2-1 | Example 2-2 | Example 2-3 | Example 2-4 | Comparative Example 2-3 |
|---|---|---|---|---|---|---|---|---|
| Cord | Structure | 1 + 6 | 1 + 6 | 3 + 9 | 3 + 9 | 3 + 8 | 3 + 6 | 3 + 9 |
| | Twist direction | —/S | —/S | Z/Z | Z/Z | Z/Z | Z/Z | Z/S |
| | Diameter (mm) | 4.62 | 4.49 | 4.49 | 4.4 | 3.91 | 4.71 | 4.49 |
| Central layer strand | Structure | 3 + 9 + 15 | 3 + 9 | 3 + 9 + 15 | 3 + 9 | 3 + 9 | 3 + 9 | 3 + 9 + 15 |
| | Twist direction | Z/Z/Z | Z/Z | Z/Z/Z | Z/Z | Z/Z | Z/Z | Z/Z/Z |
| | Filament pitch (mm) | 6/12/18 | 10/18 | 5/10/15 | 8/16 | 6/12 | 5.5/12 | 5/10/15 |
| | Strand diameter (mm) | 1.54 | 1.5 | 1.08 | 1.07 | 0.81 | 0.73 | 1.08 |
| | Filament diameter (mm) | 0.25 | 0.36 | 0.175 | 0.255 | 0.195 | 0.175 | 0.175 |
| | Helical radius (mm) | — | — | 1.164 | 1.153 | 0.873 | 0.786 | 1.164 |
| | Helical pitch (mm) | — | — | 50.0 | 55.0 | 40.0 | 45.0 | 50.0 |
| | Twist angle (rad) | — | — | 1.426 | 1.440 | 1.435 | 1.461 | 1.426 |
| | Twist angle (°) | — | — | 81.7 | 82.5 | 82.2 | 83.7 | 81.7 |
| Outer layer strand | Structure | 3 + 9 + 15 | 3 + 9 | 3 + 9 + 15 | 3 + 9 | 3 + 9 + 15 | 3 + 9 + 15 | 3 + 9 + 15 |
| | Twist direction | Z/Z/Z | Z/Z | Z/Z/Z | Z/Z | Z/Z/Z | Z/Z/Z | Z/Z/Z |
| | Filament pitch (mm) | 6/12/18 | 10/18 | 5/10/15 | 8/16 | 5/10/15 | 6/12/18 | 5/10/15 |
| | Strand diameter (mm) | 1.54 | 1.5 | 1.08 | 1.07 | 1.08 | 1.57 | 1.08 |
| | Filament diameter (mm) | 0.25 | 0.36 | 0.175 | 0.255 | 0.175 | 0.255 | 0.175 |
| | Helical radius (mm) | 2.31 | 2.25 | 2.244 | 2.223 | 1.953 | 2.356 | 2.244 |
| | Helical pitch (mm) | 45.0 | 55.0 | 65.0 | 60.0 | 50.0 | 55.0 | 65.0 |
| | Twist angle (rad) | 1.259 | 1.319 | 1.357 | 1.342 | 1.330 | 1.308 | 1.357 |
| | Twist angle (°) | 72.1 | 75.6 | 77.8 | 76.9 | 76.2 | 74.9 | 77.8 |
| Tire durability test (index) | | 100 | 91 | 135 | 130 | 139 | 128 | 96 |
| Breakage of steel cord | | Occurred | Occurred | Not occurred | Not occurred | Not occurred | Not occurred | Occurred |

As obvious from Table 2, no steel cord of all the tires in Examples was broken, resulting in confirmation of high durability of the tires.

The invention claimed is:

1. A steel cord for reinforcing rubber comprising a double-twist structure that includes a plurality of strands twisted together in the same direction with the same pitch and comprising a central structure and at least one outer layer, wherein
the central structure is composed of at least two strands being twisted around each other and each of the at least two strands is composed of at least seven filaments being twisted together.

2. The steel cord for reinforcing rubber according to claim 1, wherein the strands have a layer twist structure having two or more layers.

3. The steel cord for reinforcing rubber according to claim 2, wherein the cord has a 12×(3+9) twist structure.

4. The steel cord for reinforcing rubber according to claim 2, wherein the cord has a 3×(3+9)+9×(3+9+15) twist structure.

5. The steel cord for reinforcing rubber according to claim 2, wherein the cord has a 12×(3+9+15) twist structure.

6. The steel cord for reinforcing rubber according to claim 2, wherein the cord has a 27×(1+6) twist structure.

7. The steel cord for reinforcing rubber according to claim 1, wherein the filament diameter of each filament constituting the strand is 0.14 mm or more and 0.36 mm or less.

8. A steel cord for reinforcing rubber comprising at least three core strands being twisted together and at least six sheath strands being twisted together around the core strands, wherein the core strands and the sheath strands are twisted in the same direction;
wherein the helical radius r and the helical pitch p of the core strands and the helical radius R and the helical pitch P of the sheath strands satisfy the following relationship:

$$86° \geq \tan^{-1}(p/2\pi r) \geq \tan^{-1}(P/2\pi R) \geq 74°.$$

9. The steel cord for reinforcing rubber according to claim 8, wherein the sheath strands have a layer twist structure having two or more layers.

10. The steel cord for reinforcing rubber according to claim 9, wherein the cord has a 3×(3+9+15)+9×(3+9+15) twist structure.

11. The steel cord for reinforcing rubber according to claim 9, wherein the cord has a 3×(3+9)+9×(3+9) twist structure.

12. The steel cord for reinforcing rubber according to claim 9, wherein the cord has a 3×(3+9)+8×(3+9+15) twist structure.

13. The steel cord for reinforcing rubber according to claim 9, wherein the cord has a 3×(3+9)+6×(3+9+15) twist structure.

14. The steel cord for reinforcing rubber according to claim 9, wherein the cord has a 3×(3+9)+9×(3+9+15) twist structure.

15. The steel cord for reinforcing rubber according to claim 8, wherein the filament diameter of each filament constituting the strand is 0.14 mm or more and 0.36 mm or less.

16. A pneumatic radial tire having a framework formed of a carcass toroidally extending between a pair of bead portions and a crown portion of the carcass being reinforced by a belt layer, wherein the steel cord for reinforcing rubber according to claim 1 is used as a cord constituting the carcass and/or the belt layer.

17. The steel cord for reinforcing rubber according to claim 1, wherein each of the plurality of strands is composed of at least seven filaments being twisted together.

* * * * *